United States Patent Office 3,046,239
Patented July 24, 1962

3,046,239
BLEND OF POLYMERIC PRODUCTS
William C. Calvert, Gary, Ind., assignor to Borg-Warner Corporation, Chicago, Ill., a corporation of Illinois
No Drawing. Filed Oct. 22, 1958, Ser. No. 768,829
8 Claims. (Cl. 260—28.5)

This application is a continuation-in-part of my copending application S.N. 600,684, filed July 30, 1956, now abandoned.

This invention relates to polymeric product blends exhibiting new and unexpected properties. More particularly, this invention relates to polymeric product blends exhibiting high impact values. In another specific aspect thereof, this invention relates to polymeric product blends exhibiting a high resistance to aging.

Within recent years it has become increasingly common practice to prepare synthetic polymer products by the "graft" copolymerization technique. As may be determined by reference to the Report on Nomenclature of the International Union of Pure and Applied Chemistry (published in the Journal of Polymer Science, volume 8, page 260, 1952), the term "graft copolymerization" is employed to designate the process wherein a polymerizable monomer (or mixture of polymerizable monomers) is reacted, under polymerizing conditions, in the presence of a previously formed polymer or copolymer. "A graft copolymer is a high polymer, the molecules of which consist of two or more polymeric parts, of different composition, chemically united together. A graft copolymer may be produced, for example, by polymerization of a given kind of monomer with subsequent polymerization of another kind of monomer onto the product of the first polymerization."

By interaction under polymerizing conditions of a conjugated diolefine polymer latex or a conjugated diolefine-vinyl aromatic copolymer latex with a mixture of vinyl cyanide and a vinyl aromatic or alpha methyl styrene, graft copolymers may be produced that exhibit a high impact value. For example, by interaction under polymerizing conditions of a polybutadiene latex with a mixture of acrylonitrile and styrene, a graft copolymer is produced that exhibits a high impact value.

I have discovered that blending of graft copolymers of high impact value described in the previous paragraph with a very small amount of a condensation product formed by the dehydration of certain organo silane diols results in a composition exhibiting an even higher impact value than that exhibited by the graft copolymer alone. In addition, such blends show an enhanced resistance to aging when exposed to the weather in comparison with straight graft copolymers.

I have further discovered that enhancement in impact value and superior aging resistance are obtained by blending a very small amount of a mixture of a microcrystalline wax and a condensation product formed by the dehydration of certain organo silane diols with a graft copolymer of the nature briefly described previously herein.

One object of this invention is to provide polymeric product blends of high impact value.

Another object of this invention is to provide polymeric product blends of high resistance to aging.

A further object of this invention is to provide polymeric product blends of wide utility.

Additional objects of this invention will become apparent as the description thereof proceeds.

The preparation of condensation products (generically designated "silicones" in the art) by the dehydration of organo silane diols is now familiar to those skilled in the chemical arts. Thus, the dehydration of dimethyl silane diol, $(CH_3)_2Si(OH)_2$, results in the formation of a methyl substituted siloxane chain, the molecular weight of the resulting condensation product being a function of the severity of the condensation conditions employed. It is possible to produce liquid condensation polymers of dimethyl silane diol having viscosities ranging from 0.65 centistoke at 77° F. to 1,000,000 or more centistokes at 77° F. Such dimethyl silicones are marketed, for example, by Dow Corning Corporation under the designation Dow Corning No. 200 Fluids and General Electric Co. under the designation SF-69 and SF-99. This condensation polymerization reaction is also capable of producing materials of such high molecular weight as to be solid or semi-solid at room temperature. Thus, Dow Corning No. 400 Gum and Dow Corning No. 401 Gum are both dimethyl polysiloxanes of such high molecular weight as to be solids or semi-solids.

It is not essential that dimethyl silane diol be employed to produce silicone condensation polymers. As will be obvious to those skilled in the art, silane diols of the general formula $RR'Si(OH)_2$, where R is an alkyl group and R' is hydrogen, an alkyl group, a vinyl group, or a phenyl group will all react in a manner similar to that described in connection with dimethyl silane diol. In addition, mixtures of silane diols of different types and in different proportions may be subjected to condensation polymerization to produce silicones.

Illustrative of certain portions of the general discussion of the previous paragraph, condensation polymerization of methyl hydrogen silane diol, $(CH_3)(H)Si(OH)_2$, results in the formation of a methyl hydrogen polysiloxane. Such a condensation polymer is marketed by Dow Corning Corporation under the designation Dow Corning No. 1107 Fluid.

Further illustrating certain portions of the general discussion of the penultimate paragraph, mixtures of dimethyl silane diol with methyl phenyl silane diol in various proportions may be subjected to co-(condensation polymerization) with the production of silicones exhibiting viscosities ranging from say 50 centistokes at 77° F. to 100,000 or more centistokes at 77° F. These methyl phenyl silicones are characterized by a somewhat better high temperature stability than the dimethyl silicones, the high temperature stability generally increasing as the proportion of methyl phenyl silane diol employed in the original reaction mixture is increased. Such methyl phenyl silicones are marketed, for example, by Dow Corning Corporation under such designations as Dow Corning No. 550 Fluid, Dow Corning No. 555 Fluid (both of medium phenyl content) and Dow Corning No. 702 Fluid (of high phenyl content). A similar type of reaction may be employed in the production of solid or semi-solid silicones by subjecting a mixture of dimethyl silane diol and methyl vinyl silane diol to co-(condensation-polymerization). Dow Corning No. 410 Gum and Dow Corning W-96 Gum are co-(condensation polymers) of this nature.

Silicone gums are actually uncured silicone rubbers. While all silicones described herein are stable at room temperature, on heating the above described gums to an elevated temperature in the presence of an oxidizing agent and catalyst, cure occurs with the production of a silicone rubber. Incorporation of a small controlled proportion of vinyl groups in the high molecular weight condensation polymer (No. 410 Gum; W-96 Gum) greatly enhances the speed of reaction thereof under conditions of cure.

The above information respecting silicones and much additional information on the subject may be found, for example, in the books entitled Chemistry of Silicones, E. G. Rochow, New York, 1946, and Silicones and Their Uses, R. R. McGregor, New York, 1954.

To summarize the above discussion, all silicones considered are fundamentally identical from the structural point of view. The "repeating unit" of all of them has the structural formula:

where R is a lower alkyl group, usually the methyl group, and R' may be hydrogen, a lower alkyl group (usually methyl), the phenyl group or the vinyl group.

As will be evident from the previous discussions, in the case of the No. 200 Fluids and SF–69 and SF–99 (SF: silicone fluid), R and R' of the above repeating unit structural formula are both methyl groups. Similarly, if R of the above repeating unit structural formula is methyl and R' is hydrogen the resulting condensation polymer is No. 1107 Fluid.

Further, and as has previously been set forth, it is not necessary that the identity of R' in the above repeating unit structural formula be the same over the entire length of the siloxane chain of a particular silicone. Thus, dimethyl silane diol and methyl phenyl silane diol may be admixed in various proportions and the resulting mixtures subjected to co-(condensation polymerization). In the silicones formed thereby, the R of the repeating unit structural formula is still methyl but in a portion of the repeating units R' is phenyl, R' being methyl in the remainder of the repeating units. No. 550 Fluid, No. 555 Fluid and No. 702 Fluid are all produced in this way. No. 410 Gum and W–96 Gum are made by a similar type of reaction. Here, a mixture of dimethyl silane diol and methyl vinyl silane diol is subjected to co-(condensation polymerization) to give a product in which R is again invariably methyl but in a portion of the repeating units R' is vinyl, R' being methyl in the remainder of the repeating units.

As previously mentioned, the molecular weight of silicones depends upon the extent to which the condensation polymerization reaction or the co-(condensation polymerization) reaction is carried. Thus, dimethyl silane diol produces condensation polymers ranging from liquids of low viscosity to solid or semi-solid materials such as No. 400 Gum and No. 401 Gum. Also, methyl vinyl polysiloxane, No. 410 Gum, is a co-(condensation polymerization) product of such high molecular weight as to be a semi-solid.

In producing the silicones of commerce the nature of the groups on the silane diol (and accordingly, the nature of the groups on the resulting siloxane chains) is varied as described above. Also, the etxent of the condensation polymerization reaction or of the co-(condensation polymerization) reaction is varied to bring about changes in the molecular weight of the resulting silicones, i.e. to vary the length of the siloxane chain. These variations are necessary to produce the wide range of physical and chemical properties exhibited by the silicones of commerce. However, as far as the present invention is concerned, the data to follow will show that blends of any one of these silicones with graft copolymers of the nature previously described exhibit essentially identical properties regardless of the exact nature of the silicone employed as a blending component. The previous discussion shows that all the silicones employed herein are fundamentally the same from a structural standpoint and the data to follow will show that all of them are essentially identical in action when employed in the present invention.

To facilitate the following exposition and in accordance with the practices of the art, silicones that are liquids at ordinary room temperature are generically designated "silicone fluids" herein while silicones that are solids or semi-solids at room temperature are generically designated "uncured silicone rubbers" herein.

For the better understanding of this invention, the following examples set forth complete descriptions of specific embodiments thereof. It is to be understood that these particular specific embodiments are illustrative only and the spirit and scope of the invention is not limited to the particular specific embodiments set forth.

EXAMPLE 1

The following mixture, in parts by weight, was introduced into a glass reactor:

| | |
|---|---|
| Polybutadiene latex, polybutadiene equivalent | 30.0 |
| Acrylonitrile | 25.0 |
| Styrene | 45.0 |
| Cumene hydroperoxide | 0.75 |
| Sodium salt of hydrogenated disproportionated rosin | 2.0 |
| Sodium pyrophosphate | 0.5 |
| Sodium hydroxide | 0.15 |
| Sodium salt of condensed alkyl naphthalene sulfonic acid | 0.15 |
| Dextrose | 1.0 |
| Ferrous sulfate | 0.01 |
| Water, including water present in the polybutadiene latex | 160.0 |

The above mixture was tumbled for six hours in a bath heated to 65–85° C. at which time reaction was essentially complete. The polymeric product was separated from the resulting reaction mixture by conventional methods involving coagulation with dilute brine and sulfuric acid, heating to about 95° C. to produce partial granulation of the coagulated product and so facilitate subsequent filtering and washing thereof, filtering, washing and finally drying to constant weight at 110° C.

A portion of the resulting polymeric material was formed into a sheet by milling. A molded bar of the material had a notched Izod impact value of 5.4 foot pounds per inch of notch at 23° C. (One quarter inch bars used. A.S.T.M. Method D–256–47T). (All impact values hereinafter given similarly determined).

It will be noted that the above polymerization recipe contains 30% by weight polybutadiene based on the total of polybutadiene, styrene and acrylonitrile.

Portions of the polymer prepared in accordance with this example were separately milled with a small quantity of either No. 1107 Fluid or No. 410 Gum. The impact values of the various blends prepared are presented in the following tabulation.

*Table 1*

| Weight Percent Silicone in Polymer | Impact Value, Ft. Lbs. of Blends | |
|---|---|---|
| | Blends Containing No. 410 Gum | Blends Containing No. 1107 Fluid |
| 0.0 | 5.4 | 5.4 |
| 0.0125 | | 8.2 |
| 0.025 | | 8.5 |
| 0.05 | | 8.6 |
| 0.1 | 9.1 | 9.1 |
| 0.5 | 9.4 | 9.8 |
| 1.0 | 9.6 | 10.2 |
| 3.0 | | 9.1 |

It will be noted that incorporation of a very small amount of either No. 410 Gum or of No. 1107 Fluid in the polymeric product produced in accordance with this example results in a blend having an impact value much higher than that of the straight polymer. The impact values of the blends generally increase as increasing amounts of the silicone fluid or the uncured silicone rubber are employed in forming the blends. However, following addition of the initial amount of blending agent, further additions thereof result in comparatively slight further increases in impact value; by far the greater part of the enhancement in impact value results from initially incorporating as little as 0.0125% by weight of the silicone fluid in the polymer. While increasing the silicone fluid content of the blend to 80 to 240 times this figure does result in blends having even higher impact values, the resulting increase in impact value over that of the blend containing only 0.0125% by weight of the silicone fluid is very slight, especially when considered in connection with the enormously increased amount of blending agent used.

EXAMPLE 2

Another sample of polymeric product was prepared in accordance with the directions given in Example 1. This particular sample had a notched Izod impact value of 5.0 foot pounds per inch of notch and was blended with 5% by weight of No. 410 Gum. The notched Izod impact value of the resulting blend was 7.7 foot pounds per inch of notch. It is interesting to note that the data of this blending experiment, taken in connection with those of the table of Example 1, indicate that as increasing amounts of silicone fluids or uncured silicone rubbers are blended into these polymeric products the impact values of the resulting blends, following the very pronounced enhancement resulting from addition of an initial very small quantity of blending agent, increase gradually to a maximum value on addition of further amounts of the blending agent and then finally decrease slightly with still further additions of blending agent, the maximum impact value being obtained with blends containing somewhat more than 1% blending agent.

The straight polymeric product and the polymer-No. 410 Gum blend of this example were separately sheeted and then cut to form six by six inch sheets, 0.080 inch thick. These sheets were exposed to the weather, 45° South at Gary, Indiana. From time to time, individual test sheets were laid on a steel ring with a 3⅝ inch diameter central hole and tested by dropping a 535 g. steel ball (approximately 19 ounces) from a height of 4.5 feet onto the center of the area of the test sheet that was supported by the steel ring. By this procedure, the straight polymer test sheet failed after 36 weeks' exposure but the test sheet made from the polymer-No. 410 Gum blend still survived the drop test after 52 weeks' exposure.

Sheets of the polymer-No. 410 Gum blend of this example were employed as a liner between the leaves of motor vehicle leaf spring assemblies. In an accelerated test, the resulting assembly remained adequately lubricated during the entire life of the spring. Similar results were obtained using sheets prepared from the polymer-No. 1107 Fluid blend containing 3% of No. 1107 Fluid and described in Example 1 hereof.

EXAMPLE 3

The polymerization recipe employed here was identical to that of Example 1, with the exception that the recipe of the present example in addition contained 0.5 part by weight mixed tertiary mercaptans (containing $C_{12}$, $C_{14}$ and $C_{16}$ tertiary alkyl mercaptans in approximately 60:20:20 ratio). The resulting mixture was polymerized and the polymeric product formed was recovered exactly as described in Example 1. The polymeric product prepared in accordance with this example had a much higher extrusion rate than the graft copolymer of Example 1. The notched Izod impact value of the graft copolymer of the present example was 3.7 foot pounds per inch of notch. Portions of the resulting polymeric product were separately milled with 2% by weight of a variety of silicone fluids and uncured silicone rubbers. The blending agents employed and the impact values of the resulting blends are shown in the following table.

Table 2

| Blending agent: | Notched Izod impact value, foot pounds |
|---|---|
| None | 3.7 |
| 2% Dow Corning No. 410 Gum | 7.5 |
| 2% Dow Corning No. 400 Gum | 7.8 |
| 2% Dow Corning No. 200 Fluid (350 viscosity)* | 7.0 |
| 2% Dow Corning No. 550 Fluid | 6.8 |
| 2% Dow Corning No. 702 Fluid | 6.3 |
| 2% General Electric Co. SF-69 | 8.2 |
| 2% General Electric Co. SF-99 | 8.1 |

*A liquid condensation polymer of dimethyl silane diol having the repeating structural unit

and having the following physical properties:

| | |
|---|---|
| Viscosity, cs. at 25° C | 350 |
| Viscosity, temperature coefficient [1] | 0.62 |
| Dielectric constant [2] | 2.75 |
| Pour point [3] ° C | -50 |
| Flash point [4] ° F | 600 |
| Specific gravity at 25° C | 0.972 |
| Refractive index at 25° C | 1.4032 |
| Weight, lb. per gallon at 25° C | 8.11 |

[1] $\dfrac{\text{viscosity at 210 F.}}{\text{viscosity at 100 F.}}$

[2] ASTM D-150-45T.
[3] ASTM D-97-39.
[4] ASTM D-92-33.

It will be noted that the wide variety of silicone fluids and uncured silicone rubbers tested all gave substantially similar results, producing blends showing a pronounced and fairly constant enhancement in impact value in comparison with the impact value of the straight polymer.

The straight polymer of this example failed in the previously described drop test after 20 days' exposure to the weather. All blends of the above table still passed the drop test after an exposure period of 28 weeks. The polymer-No. 410 Gum blend was prepared prior to the remaining blends of the table and accordingly a longer exposure history on this material is available. This particular blend still survived the drop test after 52 weeks' exposure.

EXAMPLE 4

Separate portions of the polymeric product prepared in accordance with Example 3 were blended with 0.5% and 0.1% by weight No. 410 Gum. The first blend withstood the previously descriped drop test after an exposure period of 52 weeks. The second blend has a shorter exposure history than the first but this second blend still withstood the drop test after 44 weeks' exposure.

EXAMPLE 5

The polymerization recipe of Example 1 was modified so as to contain 25 parts by weight polybutadiene (in the form of polybutadiene latex) together with 27 parts by weight acrylonitrile and 48 parts by weight styrene. The other components of the polymerization mixture were as set forth in Example 1 and the polymerization and polymer recovery operations were conducted as described in Example 1. The resin produced had a notched Izod impact value of 2.9 foot pounds per inch of notch.

Individual samples of this polymer were milled with various silicone fluids and uncured silicone rubbers and the impact values of the resulting blends were determined. Also, test sheets of the resulting blends, of the dimensions previously given, were exposed to the weather under conditions set forth hereinbefore and from time to time the exposed test sheets were subjected to the previously described drop test. Impact values of the straight polymer of this example, various blends prepared therefrom and the weather resistance of the straight polymer and these blends are set forth in the following table.

Table 3

| Blending Agent | | I.I.V., Ft. Lbs. | Drop Test |
|---|---|---|---|
| Designation | Wt. percent in Blend | | |
| None | | 2.9 | Failed at 4 weeks. |
| Dow Corning No. 1107 Fluid | 0.01 | 5.5 | Failed at 16 weeks. |
| Do | 0.1 | 6.7 | OK at 36 weeks. |
| Do | 1.0 | 7.0 | Do. |
| Dow Corning No. 200 Fluid 20 Viscosity* | 1.0 | 7.3 | Do. |
| Dow Corning No. 200 Fluid 60000 Viscosity | 1.0 | 7.3 | Do. |
| Dow Corning No. 555 Fluid | 1.0 | 6.3 | Do. |
| Dow Corning No. 401 Gum | 1.0 | 7.4 | Do. |
| W-96 Gum | 1.0 | 7.8 | Do. |

NOTE.—I.I.V. is notched Izod impact value.

\* A liquid condensation polymer of dimethyl silane diol having the repeating structural unit

and having the following physical properties:

| | |
|---|---|
| Viscosity, cs. at 25° C | 20 |
| Viscosity, temperature coefficient [1] | 0.59 |
| Dielectric constant [2] | 2.68 |
| Pour point [3] ° C | −60 |
| Flash point [4] ° F | 520 |
| Specific gravity at 25° C | 0.950 |
| Refractive index at 25° C | 1.400 |
| Weight, lb. per gallon at 25° C | 7.93 |

[1] $\dfrac{\text{Viscosity at 210 F.}}{\text{Viscosity at 100 F.}}$

[2] ASTM D–150–45T.
[3] ASTM D–97–39.
[4] ASTM D–92–33.

EXAMPLE 6

Another batch of polymer was prepared in accordance with the recipe of Example 5. This material had a notched Izod impact value of 2.3 foot pounds per inch of notch and failed in the drop test after four weeks exposure to the weather. The polymer was milled with 5% by weight No. 410 Gum to give a blend having a notched Izod impact value of 7.0 foot pounds per inch of notch which still survived the drop test after 52 weeks' exposure to the weather.

A consideration of the data previously given in the examples will show that the effectiveness of silicone fluids and uncured silicone rubbers in increasing the impact value of the polymeric products varies inversely with the impact value of the straight polymeric product. Thus, on incorporating more than traces (say, incorporating about 1% by weight) of a silicone fluid or an uncured silicone rubber in a polymeric product having an impact value of 2.5 foot pounds increases this original impact value about 175%; if the impact value of the straight polymer is 3.0 foot pounds, the increase is about 135%; if 4.0 foot pounds, the increase is about 95% while if the impact value of the straight polymer is 5.0 foot pounds, the increase is around 75%.

The described effects of silicone fluids and uncured silicone rubbers are quite specific to the polymeric products prepared as described herein. Thus, parallel experiments in which such silicones were blended with polystyrene, polyvinylchloride, Kralastic J (U.S. Patent 2,439,202), a 75:25 styrene-acrylonitrile copolymer resin, cellulose acetate-butyrate and the like showed no such effects.

EXAMPLE 7

An accelerated test was developed to evaluate the resistance to aging of the graft copolymers described herein and blends containing such graft copolymers. In this accelerated test, the previously described six by six inch test sheets, 0.080 inch thick, are exposed for a predetermined period of time to radiation in a Fadeometer. After exposure, the test sheets were held at −20° F. for four hours following which the test sheets were subjected to the drop test, using the steel ring and steel ball described in Example 2, the drop test also being performed at −20° F.

Separate portions of a batch of polymeric product prepared in accordance with the recipe and procedure of Example 1 were blended with various amounts of No. 200 Fluid (20 viscosity) and the test sheets of the resulting blends were subjected to the accelerated exposure and the low temperature drop test just described, the results obtained being set forth in the following table:

| Weight Percent No. 200 Fluid in Polymer | Fadeometer Exposure Time, Hrs. | Low Temperature Drop test Results |
|---|---|---|
| 0 | 11 | Shattered. |
| 1 | 22 | Some cracking. |
| 2 | 22 | Slight cracking. |
| 3 | 200 | Passed. |

EXAMPLE 8

More or less arbitrarily it was decided that a test panel surviving the low temperature drop test after 200 hours' exposure to radiation in the Fadeometer exhibited a satisfactory resistance to aging. On this basis, it is evident from the data of Example 7 that the graft copolymer requires about 3% by weight of No. 200 Fluid to exhibit the arbitrarily selected resistance to aging. Accordingly, a series of blends were prepared, using the graft copolymer of Example 7, in which a total of 3% blending agents (or blending agent) were incorporated therein. A mixture of No. 200 Fluid (20 viscosity) and a microcrystalline wax was employed in making most of these blends. One blend contained 3% by weight microcrystalline wax alone. Test sheets of the resulting blends were subjected to the accelerated test described in Example 7, the results obtained being set forth in the following table. For completeness, data on the straight graft copolymer and the graft copolymer containing 3% by weight No. 200 Fluid (both from Example 7) are also included in the tabulation.

| Weight Percent No. 200 Fluid in Polymer | Weight Percent Microcrystalline Wax in Polymer | Fadeometer Exposure Time, Hrs. | Low Temperature Drop Test Results |
|---|---|---|---|
| 0 | 0 | 11 | Shattered. |
| 3.0 | 0 | 200 | Passed. |
| 1.5 | 1.5 | 200 | Do. |
| 1.0 | 2.0 | 200 | Do. |
| 0.5 | 2.5 | 200 | Do. |
| 0.3 | 2.7 | 200 | Do. |
| 0.1 | 2.9 | 200 | Do. |
| 0.1 | 2.9 | 176 | Slight cracking. |
| 0.05 | 2.95 | 22 | Very slight cracking. |
| 0 | 3.0 | 22 | Slight cracking. |

The above data show that No. 200 Fluid may be essentially but not quite completely replaced by microcrystalline wax in producing polymer blends that survive the low temperature drop test after 200 hours' exposure to radiation in the Fadeometer. Incorporation of 0.3% by weight of the silicone fluid and 2.7% by weight microcrystalline wax in the graft copolymer produces a satisfactory blend but use of 0.1% by weight silicone fluid and 2.9% by weight microcrystalline wax produces a blend that does not quite meet the arbitrarily selected standard. Also, it will be noted that adding 3% by weight microcrystalline wax alone to the polymer produces a blend that is decidedly deficient with respect to aging. In an additional experiment (not shown in the table), 5% by weight microcrystalline wax was blended into the graft copolymer. A test sheet of the resulting blend was subjected to the previously described accelerated test. It showed slight cracking under the low temperature drop test after 22 hours' exposure to radiation in the Fadeometer.

EXAMPLE 9

Microcrystalline wax is specific as an essentially complete replacement for silicone fluids and uncured silicone rubbers in the production of graft copolymer blends of excellent aging characteristics. A large number of other materials which, on the basis of molecular structure and general effects when blended into plastics, might be expected to possess replacement characteristics similar to microcrystalline wax actually exhibit no such properties. In the following table data on two such typical potential replacement materials are shown. These are dibutyl sebacate and a polyethylene glycol of 3000–3700 average molecular weight.

| Weight percent No. 200 Fluid in Polymer | Weight percent Second Blending Agent in Polymer | Fadeometer Exposure Time, Hrs. | Low Temperature Drop Test Results |
| --- | --- | --- | --- |
| 0 | 0 | 11 | Shattered. |
| 1.0 | 0 | 22 | Some cracking. |
| 2.0 | 0 | 22 | Slight cracking. |
| 1.5 | 1.5 | 22 | Do. |
| 1.5 | 2 1.5 | 22 | Do. |
| 1.5 | 3 1.5 | 200 | Passed. |

1 Dibutyl sebacate.
2 Polyethylene glycol of 3000–3700 average molecular weight.
3 Microcrystalline wax.

It will be noted from the data of the above table that graft copolymers containing 1.5% by weight No. 200 Fluid plus 1.5% by weight of either dibutyl sebacate or of the polyethylene glycol have essentially the same aging characteristics as graft copolymer containing from 1 to 2% by weight No. 200 Fluid alone. In distinct contrast, graft copolymers containing 1.5% by weight No. 200 Fluid and 1.5% by weight microcrystalline wax survive the low temperature drop test even after 200 hours' exposure to radiation in the Fadeometer.

While this invention has been described in connection with blending silicone fluids or uncured silicone rubbers, or such materials in admixture with microcrystalline wax, with products produced by the interaction, under polymerizing conditions, of a polybutadiene latex with a mixture of styrene and acrylonitrile, it is not limited thereto. Polymeric materials suitable for use in the production of the blends of this invention may be prepared by the interaction, under polymerizing conditions, of a conjugated diolefine polymer latex or a conjugated diolefine-vinyl aromatic copolymer latex with a mixture of vinyl cyanide and a vinyl aromatic alpha methyl styrene. From 20 to 60%, preferably 20 to 50%, by weight conjugated diolefine polymer latex or conjugated diolefine-vinyl aromatic copolymer latex is used together with from 10 to 25%, preferably 20 to 25%, by weight vinyl cyanide and 30 to 70%, preferably 30 to 60% by weight vinyl aromatic or alpha methyl styrene.

The graft copolymers used in preparing the blends described in the various examples set forth herein contained a stabilizer such as is conventionally employed in connection with such materials. These graft copolymers are conventionally stabilized by incorporation therein of small amounts of such materials as 2,2-methylene bis (4-methyl 6-t-butyl cresol), di-t-butyl p-cresol, heptylated diphenyl amine and the like. The stabilizer selected may be conveniently incorporated into the polymer by adding the required amount of the stabilizer to the reaction mixture after polymerization is complete but prior to coagulation. These stabilizers decrease the rate of deterioration of these polymers with time and accordingly increase the commercial acceptability of such materials.

Be it remembered, that while this invention has been described in connection with specific details and specific embodiments thereof, these details and embodiments are illustrative only and are not to be considered limitations on the spirit or scope of said invention except insofar as these may be incorporated in the appended claims.

I claim:

1. A blend comprising (1) a major portion of a graft copolymer of a material selected from the group consisting of conjugated diolefine polymer latices and conjugated diolefine-monovinyl aromatic hydrocarbon copolymer latices with a mixture of vinyl cyanide and a material selected from the group consisting of monovinyl aromatic hydrocarbons and alpha methyl styrene and (2) a minor portion of a silicone derived from the condensation of at least one compound selected from the group of organo silane diols having the structural formula

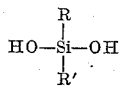

where R is a lower alkyl radical and R′ is a radical selected from the group consisting of the hydrogen radical, lower alkyl radicals, the phenyl radical and the vinyl radical.

2. The composition of claim 1, further characterized by the fact that said composition contains from about 0.01 to about 5 parts by weight of the silicone blending component per 100 parts by weight of the graft copolymer.

3. A blend comprising (1) a microcrystalline wax, (2) a silicone derived from the condensation of at least one compound selected from the group of organo silane diols having the structural formula

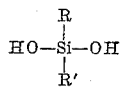

where R is a lower alkyl radical and R′ is a radical selected from the group consisting of the hydrogen radical, lower alkyl radicals, the phenyl radical and the vinyl radical, and (3) a graft copolymer of a material selected from the group consisting of conjugated diolefine polymer latices and conjugated diolefine-monovinyl aromatic hydrocarbon copolymer latices with a mixture of vinyl cyanide and a material selected from the group consisting of monovinyl aromatic hydrocarbons and alpha methyl styrene, said graft copolymer constituting the major portion of the blend.

4. The composition of claim 3, further characterized by the fact that the weight ratio of the silicone blending components to the microcrystalline wax in said composition is at least 0.03 and that the composition contains approximately 3 parts by weight microcrystalline wax plus silicone blending agent for 100 parts by weight of the graft copolymer.

5. The composition of matter comprising a blend of (1) microcrystalline wax, (2) a silicone derived from the condensation of at least one compound selected from the group of organo silane diols having the structural formula

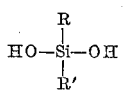

where R is a lower alkyl radical and R′ is a radical selected from the group consisting of the hydrogen radical, lower alkyl radicals, the phenyl radical and the vinyl radical, and (3) a graft copolymer of a polybutadiene latex with a mixture of vinyl cyanide and styrene, said graft copolymer constituting the major portion of the composition.

6. The composition of matter comprising a major portion of a graft copolymer of polybutadiene, styrene and vinyl cyanide, there also being present, per 100 parts by weight of said graft copolymer, from about 0.01 to about 5 parts by weight of a silicone derived from the condensation of at least one compound selected from the group of organo silane diols having the structural formula

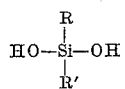

where R is a lower alkyl radical and R' is a radical selected from the group consisting of the hydrogen radical, a lower alkyl radical, the phenyl radical and the vinyl radical.

7. The composition of matter comprising a major portion of a graft copolymer of polybutadiene, styrene and vinyl cyanide, there also being present, per 100 parts by weight of said graft copolymer, approximately 3 parts by weight microcrystalline wax plus a silicone derived from the condensation of at least one compound selected from the group of organo silane diols having the structural formula

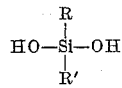

where R is a lower alkyl radical and R' is a radical selected from the group consisting of the hydrogen radical, a lower alkyl radical, the phenyl radical and the vinyl radical, the weight ratio of the silicone blending agent to the microcrystalline wax in said composition being at least 0.03.

8. A blend comprising (1) a major portion of a graft copolymer of polybutadiene latex with a mixture of vinyl cyanide and styrene and (2) a minor portion of a silicone derived from the condensation of at least one compound selected from the group of organo silane diols having the structural formula

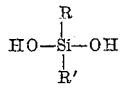

where R is a lower alkyl radical and R' is a radical selected from the group consisting of the hydrogen radical, lower alkyl radicals, the phenyl radical and the vinyl radical.

References Cited in the file of this patent

UNITED STATES PATENTS

| | | |
|---|---|---|
| 2,445,727 | Kinzinger | July 20, 1948 |
| 2,558,584 | Safford | June 26, 1951 |
| 2,700,185 | Lee | Jan. 25, 1955 |
| 2,802,808 | Hayes | Aug. 13, 1957 |
| 2,820,773 | Childers et al. | June 21, 1958 |

FOREIGN PATENTS

| | | |
|---|---|---|
| 649,166 | Great Britain | Jan. 17, 1951 |